United States Patent [19]
Matsubara et al.

[11] Patent Number: 6,124,872
[45] Date of Patent: Sep. 26, 2000

[54] OPTICAL WRITING DEVICE WITH CONTROLLED DRIVING VOLTAGES

[75] Inventors: Ken Matsubara, Takatsuki; Tomohiko Masuda, Otsu; Yuji Kamoda, Ibaraki, all of Japan

[73] Assignee: Minolta Co., Ltd., Osaka, Japan

[21] Appl. No.: 09/358,490

[22] Filed: Jul. 22, 1999

[30] Foreign Application Priority Data

Jul. 23, 1998 [JP] Japan .................................. 10-207297

[51] Int. Cl.[7] .............................. G06F 1/03; G03G 15/04
[52] U.S. Cl. ...................... 347/133; 347/136; 347/236; 349/3; 359/239; 359/245
[58] Field of Search .................................. 347/133, 136, 347/236, 246; 359/239, 245; 349/2, 3

[56] References Cited

U.S. PATENT DOCUMENTS 5,247,387  9/1993  Matsubara et al. ..................... 359/276

FOREIGN PATENT DOCUMENTS 4-115219  4/1992  Japan .

*Primary Examiner*—Joan Pendegrass
*Attorney, Agent, or Firm*—McDermott, Will & Emery

[57] ABSTRACT

Disclosed is an optical writing device having an array of a plurality of writing light shutter elements for an image forming purpose. The optical writing device also has at least one first monitoring light shutter element and at least one second monitoring light shutter element. During recording period, the first second monitoring light shutter element is frequently driven, and the second monitoring light shutter element is infrequently driven. After the recording period, the first and second monitoring light shutter elements are driven with varying voltage, and light amounts from the first and second monitoring light shutter elements are sensed by a sensor. Based on the output from the sensor, optimal drive voltage for the next recording period is set.

10 Claims, 5 Drawing Sheets

OPTICAL WRITING DEVICE WITH CONTROLLED DRIVING VOLTAGES

This application is based on Japanese Patent Application No. HEI 10-207297 filed in Japan, the content of which is hereby incorporated by reference.

BACKGROUND OF THE INVENTION

1. Field of the Invention

The present invention pertains to an optical writing device that writes or displays images on an image receiving surface, e.g., a photosensitive material, a screen, or a naked eye, and more particularly, to an optical writing device in which an electro-optical material such as PLZT is used for the light shutter elements.

2. Description of Related Art

An image forming apparatus that forms images (latent images) by exposing photographic paper or film using a silver photosensitive material or a photosensitive drum for electronic photography by means of an optical writing device is conventionally known. One solid-state scanning type form of this optical writing device, in which a PLZT optical shutter element array is used, is known. In an optical writing device of this solid-state scanning type, a polarizer and an analyzer are located in the upstream side and the downstream side of the light path relative to the light shutter element array, respectively. The polarizer and the analyzer are arranged in a Cross-Nicoled fashion relative to the light shutter elements. Because PLZT is a material that has an electro-optical effect, as is publicly known, light may be allowed to pass through or prevented from passing through each light shutter element by controlling the applied voltage. FIG. 6 shows the relationship between the drive voltage for each light shutter element and the amount of pass-through light. In the drawing, the characteristic A represents the characteristic in the initial stage, and the light shutter element is driven at all times using a half-wavelength voltage $V_H$ that achieves the maximum amount of pass-through light.

However, when an electrical field running in a certain direction is applied to the light shutter element at all times, the initial characteristic A changes into the characteristic B. If the application of the electric field is continued, the characteristic changes into the characteristic C. In other words, even if the same voltage $H_V$ is applied, the amount of pass-through light decreases by $\Delta I_B$ for the characteristic B and by $\Delta I_C$ for the characteristic C. This change in the amount of pass-through light is larger for elements that are driven more frequently per unit of time, which leads to the problem of degraded image quality.

Therefore, the applicant has proposed, as disclosed in Laid-Open Japanese Patent Application HEI 4-115219, to incorporate a means to monitor the characteristic of the light shutter elements and control the recovery of the characteristic in accordance with the monitored amount of light. However, using this invention, because the attempt to recover the characteristic is made during the application of an alternating electrical field, a relatively long period of time is required, and due to the need to monitor the amount of light corresponding to the alternating electrical field, the circuit becomes complex in construction.

SUMMARY OF THE INVENTION

The object of the present invention, therefore, is to provide an improved optical writing device. Another object of the present invention is to provide a solid-state scanning optical writing device that can prevent, by means of a relatively simple construction, large variations in the amount of pass-through light among the light shutter elements, which occur due to variations in the frequency with which they are driven.

In order to achieve at least one of the objects described above, the optical writing device of the present invention uses at least one first monitoring light shutter element and at least one second monitoring light shutter elements that may be made of an electro-optical material and are separate from writing light shutter elements used for image writing purposes. The first monitoring light shutter element is driven under a first condition, while the second monitoring shutter element is driven under a second condition, wherein the first condition is to drive the first monitoring light shutter element frequently, and the second condition is to drive the second monitoring light shutter element infrequently. It is preferred that the driving of the first and second monitoring light shutter elements occur while the image writing is being performed by means of the writing light shutter elements, i.e., during the recording period. When writing or recording is completed, the first and second monitoring light shutter elements are driven with at varying voltages. When the amount of light exiting from the first and second monitoring shutter elements is detected at this time, the average characteristic of the amount of pass-through light from the first monitoring light shutter element that is driven frequently and the second monitoring light shutter element that is driven infrequently may be obtained. The driving voltage at which the amount of exiting light was the largest is then determined and is fed back to the driving of the writing light shutter elements during the next recording session.

Various conditions may be used for the first and second conditions. For example, for the first condition, the same condition as for the writing light shutter element which is most frequently driven may be used, and for the second condition, the same condition as for the writing light shutter element which is driven most infrequently may be used. This enables control that accurately reflects the actual hysterisis based on the driving of the writing light shutter elements.

As another example, the first condition can be that the first monitoring light shutter element is continuously activated and the second condition can be that the second monitoring light shutter element is not activated at all. Using this method, while the accuracy decreases slightly in comparison with the previous example, control that is problem-free as a practical matter may be obtained. Further, because it is not necessary to refer to the driving condition of the writing light shutter elements, the construction of the optical writing device may be made simpler.

In addition, when the first and second monitoring light shutter elements are driven at varying voltages, it is preferred that the voltage be continuously varied within a prescribed range. It is preferred that the prescribed range include zero volts up to a voltage that exceeds the high-wavelength voltage.

Using the present invention, a proxy of an average characteristic of the amount of pass-through light of all of the writing light shutter elements may be obtained by detecting the amount of exiting light from the first and second monitoring light shutter elements, and the average optimal driving voltage may be fed back, allowing the variation in the amount of pass-through light among the light shutter elements that occurs during the recording period due to differences in the frequency of driving to be reduced, such that stable high-quality images may be obtained. In addition, in comparison with the method in which the characteristic of the light shutter elements is sought to be recovered based on the monitoring of the light amount while applying an alternating electric field, the present invention may be realized using a simpler construction and the processing takes a shorter period of time.

These and other objects, advantages and features of the invention will become apparent from the following description thereof taken in conjunction with the accompanying drawings which illustrates a specific embodiment of the invention.

DETAILED DESCRIPTION OF THE PREFERRED EMBODIMENTS

The embodiments of the optical writing device pertaining to the present invention are explained below with reference to the accompanying drawings.

First Embodiment

Figure 1:
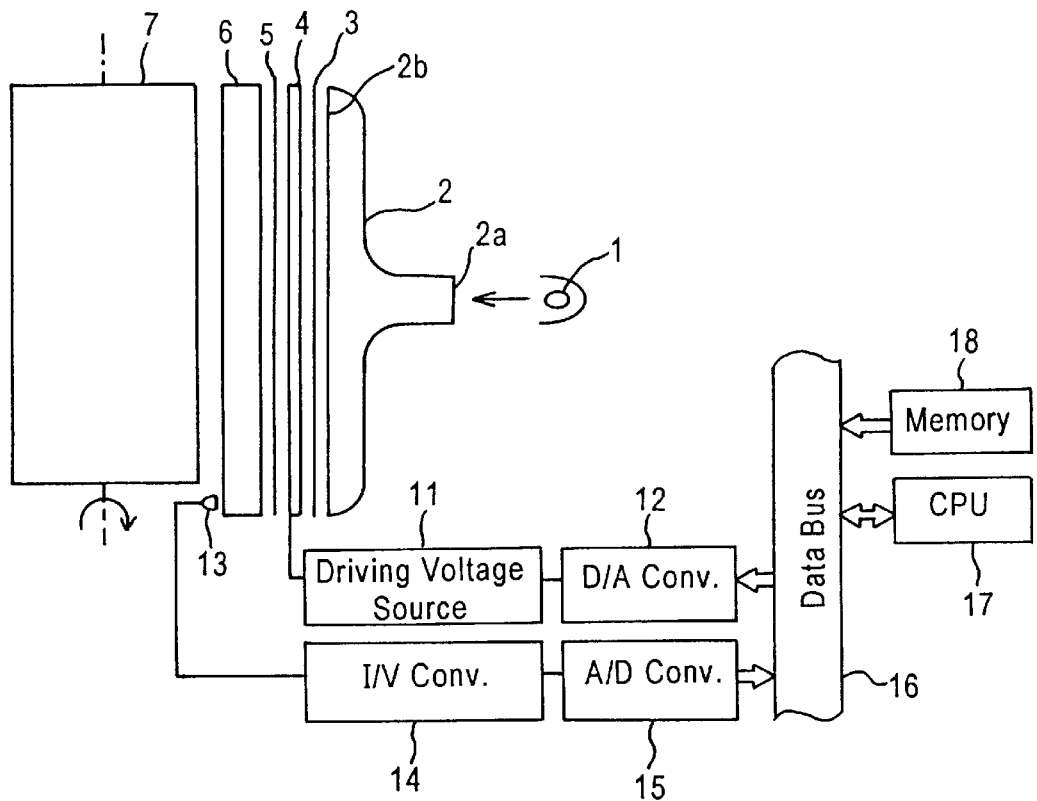
FIG. 1 is a drawing that shows the basic construction of the image recording device, one embodiment of the present invention.

An image forming apparatus in which the optical writing device, which comprises the first embodiment of the present invention, is applied is shown in FIG. 1. This image forming apparatus forms electrostatic latent images on the surface of the photoreceptor drum 7 by exposing the drum 7 by the optical writing device. The optical writing device includes a light source (halogen lamp) 1, an optical fiber array 2, a polarizer 3, a light shutter module 4, an analyzer 5 and an image forming lens array 6. Further, as a characteristic element of this embodiment, a driving power supply 11 for the corrective process and a photosensor 13, which are described below, are included. The optical fiber array 2 comprises numerous individual optical fibers bound together. The light emitted from the light source 1 irradiates the light incidence end 2a and exits the optical fiber array 2 from the other end 2b in a linear fashion.

Figure 2:
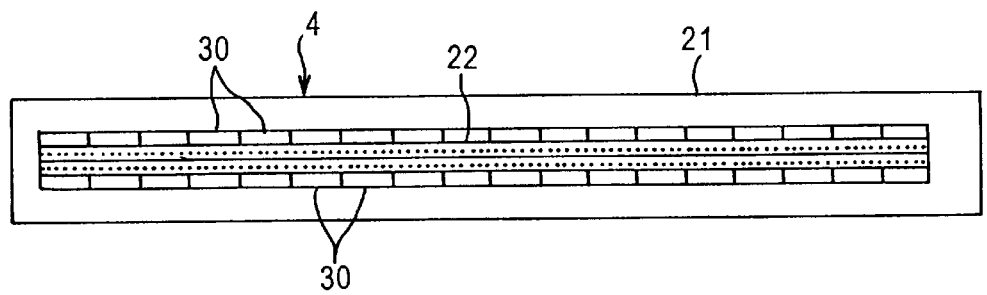
FIG. 2 is a plan view showing a light shutter module.
Figure 3:
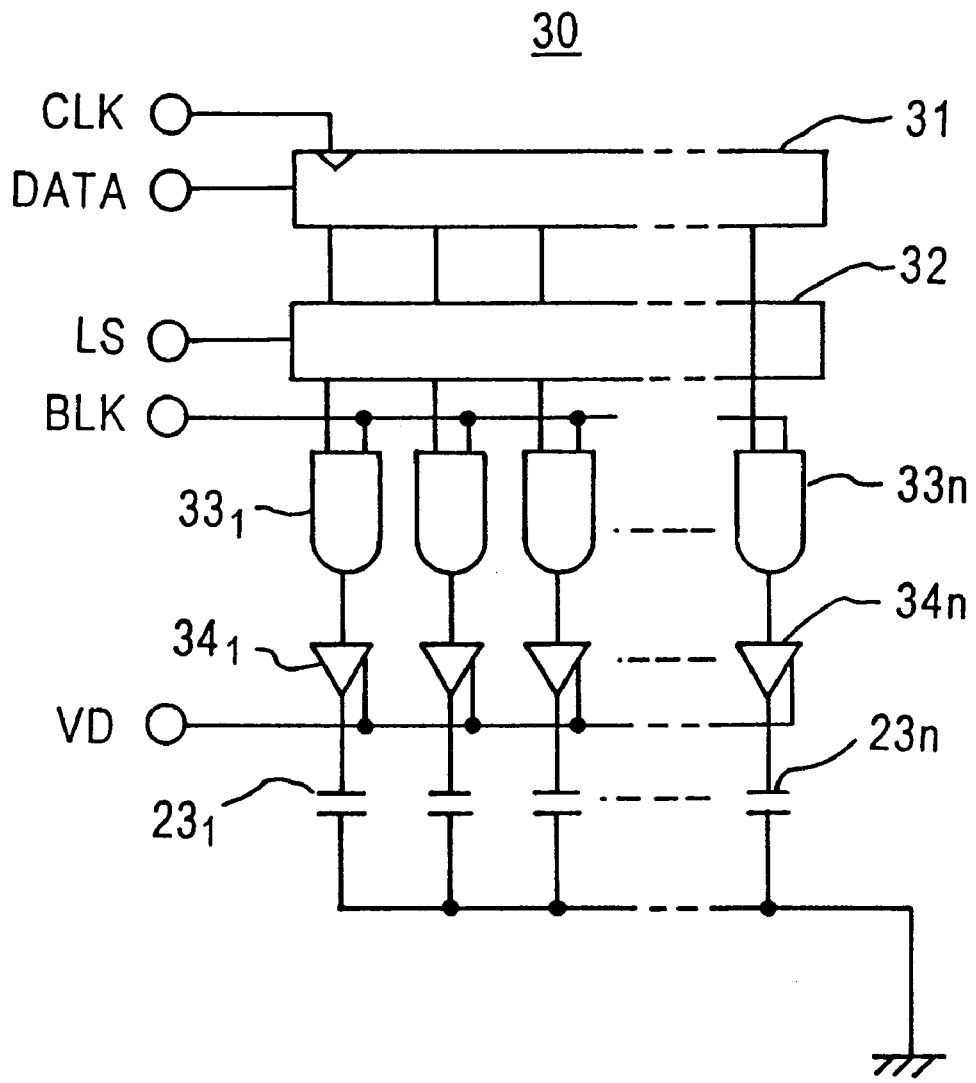
FIG. 3 is a block diagram showing the driving circuit for the light shutter elements.

The light shutter module 4 comprises a ceramic or glass substrate 21 having a slit opening and an array 22 comprising multiple light shutter chips made of PLZT and located on the substrate 21, as shown in FIG. 2. Each of the light shutter chips has multiple light shutter elements, each of which comprises one pixel. The light shutter elements are arranged in two rows such that the elements are arranged in a zigzag fashion and the two rows of light shutter elements together form images corresponding to one line in the main scanning directions. PLZT comprises a light-permeable ceramic substance having an electro-optical effect with a large Kerr constant, as is commonly known in the field. The light that undergoes linear polarization by the polarizer 3 experiences rotation of the plane of polarization when a voltage is applied to the light shutter element, and exits through the analyzer 5. When no voltage is applied, the plane of polarization does not rotate and the pass-through light, which did not undergo rotation of the plane of polarization, is cut off by the analyzer 5.

In other words, as the application of a voltage to the light shutter element is turned ON and OFF, the light permeation property is also turned ON and OFF. The light that exits the analyzer 5 forms an image on the photoreceptor drum 7 via the image forming lens array 6, resulting in the formation of an electrostatic latent image on the drum 7. The light shutter elements are turned ON and OFF one line at a time in accordance with the image data (main scanning). By synchronizing the main scanning and the speed of rotation of the photoreceptor drum 7 in one direction (secondary scanning), a two-dimensional image (or a latent image) is formed on the drum 7.

The light shutter elements are individually driven by the drive ICs 30 that are located on both sides and along the array 22. Each drive IC 30 comprises a shift register 31, a latch circuit 32, AND gates 33 ($33_1$~$33_n$), and high-voltage drivers 34 ($34_1$~$34_n$).

Image data DATA is sent to the shift register 31 in synchronization with a clock signal CLK and is latched to the latch circuit 32 when a latch strobe signal LS is issued. A voltage VD is applied to the light shutter elements $23_1$ through $23_n$ from the high-voltage drivers $34_1$ through $34_n$, respectively, in a pulse fashion based on the image data DATA and the turning ON and OFF of a signal BLK via the AND gates $33_1$ through $33_n$. When this takes place, bi-refraction occurs in the PLZT and the incident light passes through while being polarized. The relationship between the incident light and the exiting light is expressed by the following equation.

$$I_o/I_i = \sin^2(-\pi \cdot n^2 \cdot R \cdot L \cdot E^2/2\lambda)$$

Figure 6:
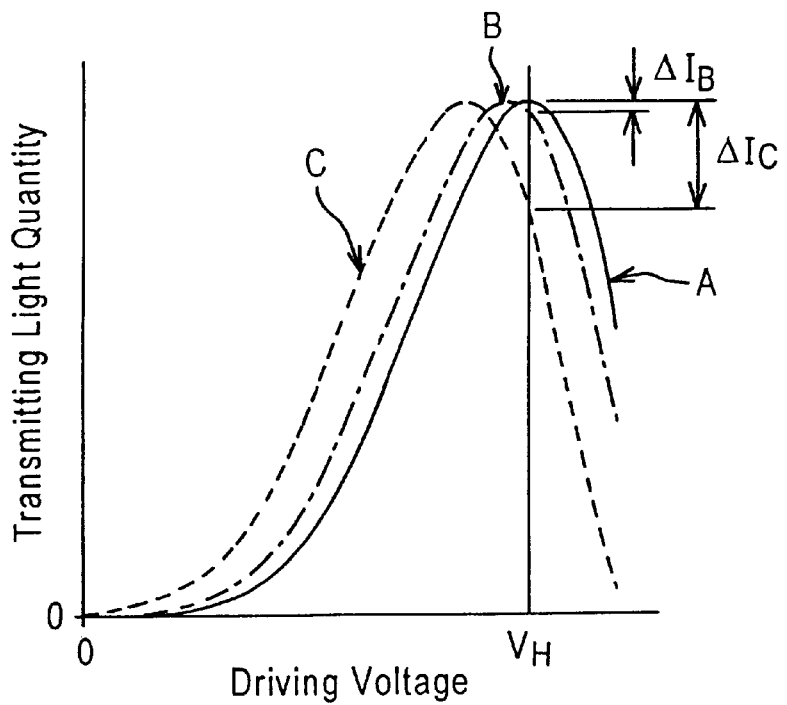
FIG. 6 comprises graphs showing the relationship between the driving voltage and the amount of pass-through light from the light shutter element.

$I_o$: Amount of exiting light
$I_i$: Amount of incident light
n: PLZT refractive index
R: Kerr constant
L: Length of light path
E: Strength of electrical field
$\lambda$: Light wavelength The light shutter element made of PLZT is electrically equivalent to a condenser and is charged when a voltage is applied to its electrodes. While a regular condenser releases all electrical charge by short-circuiting the electrodes, with PLZT, even if the electrodes are short-circuited, some electrical charge remains. As the residual electrical charge accumulates, as shown in FIG. 6, the pass-through light amount characteristic changes from that of the beginning stage, i.e., the initial characteristic A, to the characteristic B and then to the characteristic C, where the amount of pass-through light decreases by $\Delta I_B$ and $\Delta I_C$, respectively, depending on the frequency with which the light shutter element is driven.

Figure 7:
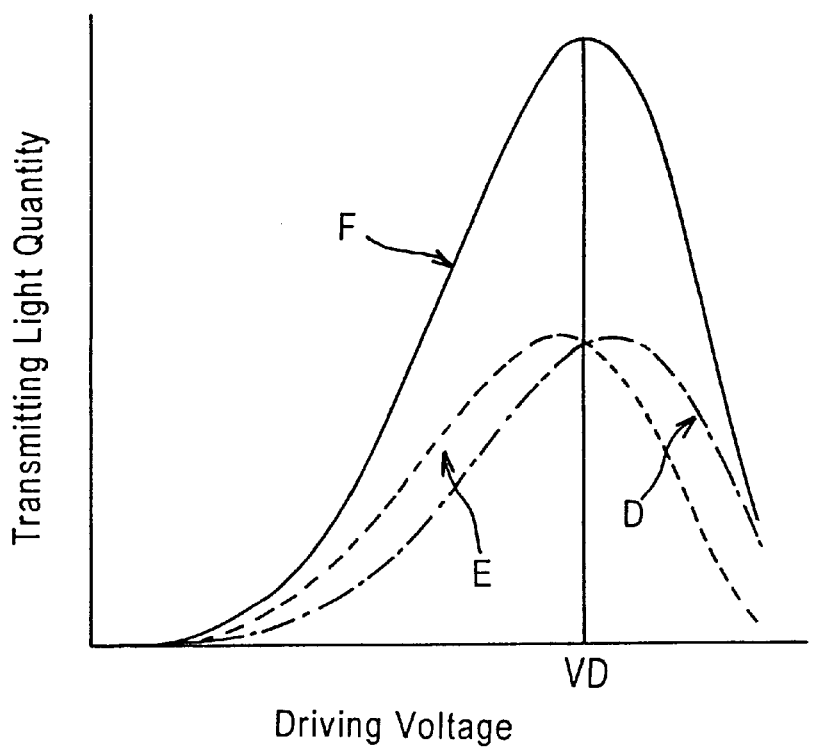
FIG. 7 comprises graphs to explain the principle by which the optimal driving voltage is determined in the present invention.

FIG. 7 shows the amount of pass-through light after the light shutter element is driven for a certain recording period. In the drawing, the characteristic D represents the amount of pass-through light relative to the driving voltage of the light shutter element which is driven most infrequently and the characteristic E represents the amount of pass-through light relative to the driving voltage of the light shutter element which is driven most frequently. It is presumed that the characteristic of other light shutter elements falls somewhere between the characteristics D and E. Here, the driving voltage that can minimize the variation in the output light amount among the light shutter elements is the voltage at the point at which the characteristic D and the characteristic E intersect. This intersection point voltage is a voltage VD by which the maximum light amount for the characteristic F, which is obtained by adding the characteristics D and E, is obtained.

Figure 4:
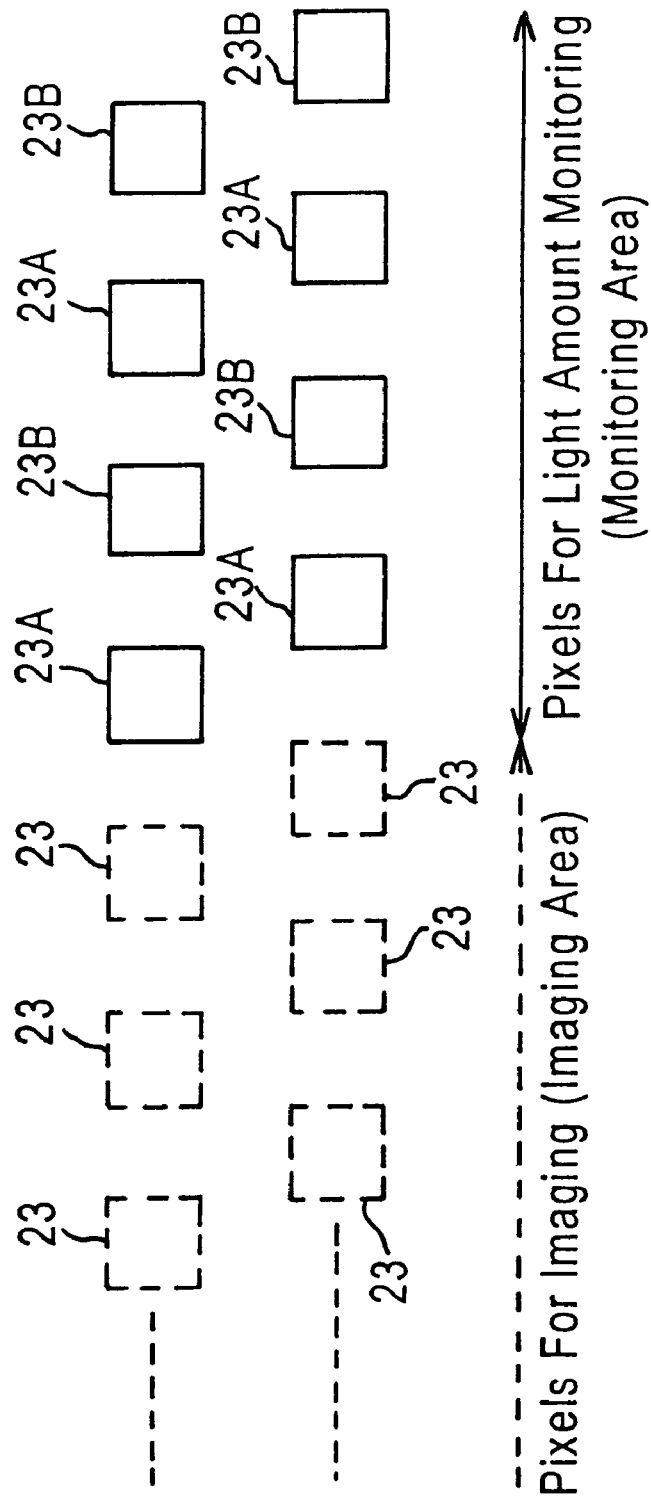
FIG. 4 is a drawing showing the alignment of the light shutter elements used for recording and monitoring purposes.

In consideration of the facts described above, in this embodiment, the same number of multiple light amount-monitoring multiple light shutter elements 23A and 23B were located next to the recording light shutter elements 23 on one end such that they would comprise a single array 22, as shown in FIG. 4. Further, a driving voltage source or power supply 11 (see FIG. 1) to drive all the light shutter elements including the monitoring light shutter elements 23A and 23B, and a photosensor 13 to detect the amount of light exiting from the monitoring light shutter elements 23A and 23B were also used. The light shutter elements 23A are driven using the same condition as the recording light shutter element that is driven most frequently during a recording period. On the other hand, the light shutter elements 23B are driven using the same condition as the recording light shutter element that is driven most infrequently during a recording period.

This control is executed by the CPU 17 selecting the light shutter element that is driven most frequently and the light shutter element that is driven most infrequently based on the image data visualized on a data map which is located in memory 18 in FIG. 1 and inputting the same driving conditions as used for these elements to the drive power supply 11 via the data bus 16 and the D/A converter 12 to drive the monitoring light shutter elements 23A and 23B using their respective conditions. Naturally, the light shutter elements 23A and 23B are located in an area that is outside the imaging or recording area of the photoreceptor drum 7.

Figure 5:
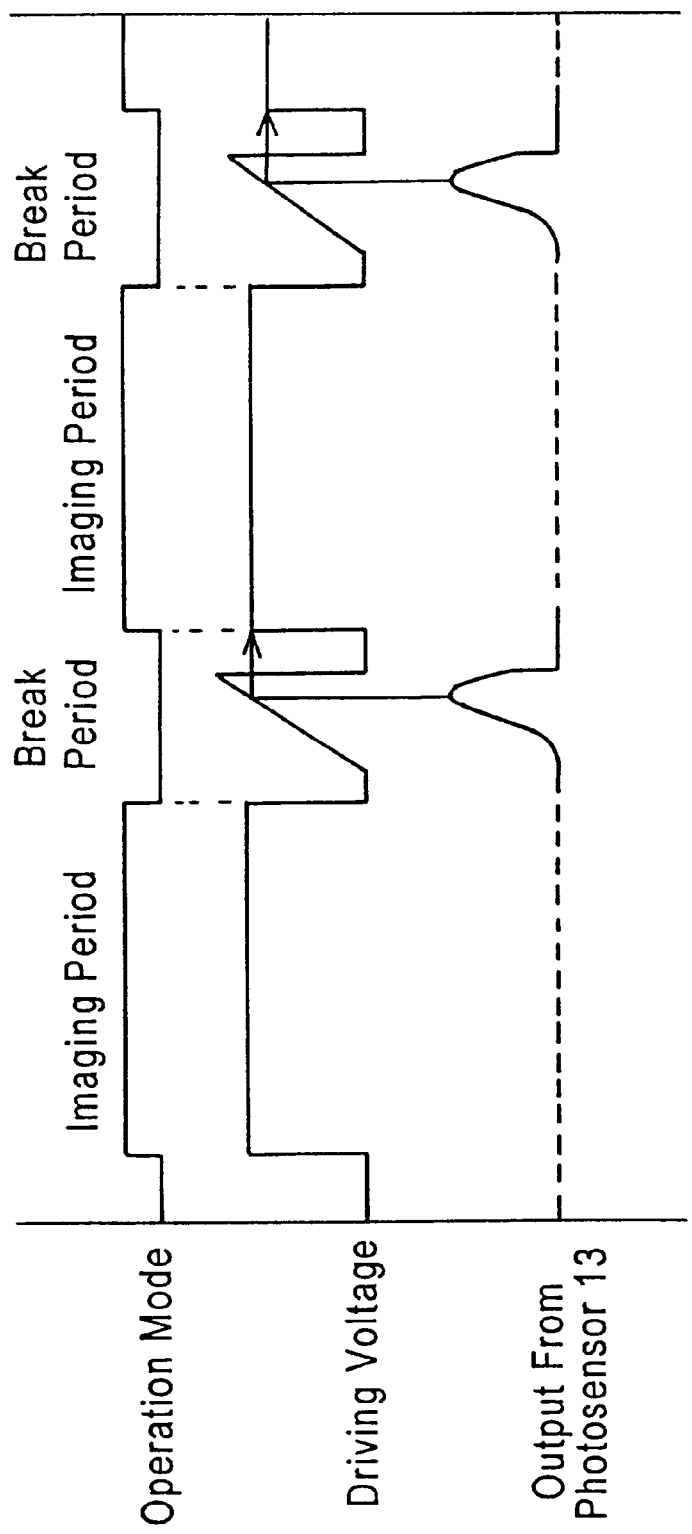
FIG. 5 is a chart showing the control timing.

During a non-imaging or non-recording (break) period, the monitoring light shutter elements 23A and 23B are driven using a voltage that continuously changes from 0V to a level exceeding the half-wavelength voltage and the amount of light exiting from them is detected by means of the photosensor 13. The driving voltage and the output from the photosensor 13 at this time appear as shown under the 'break period' in the timing chart of FIG. 5. The output from the photosensor 13 corresponds to the sum characteristic F shown in FIG. 7. The driving voltage VD at which the maximum light amount is obtained is determined from the peak value of the characteristic F. In the next recording period, the recording light shutter elements 23 are driven using the voltage VD thus obtained. Through such feedback control, the variation in light amount caused by the differences in driving frequency among the recording light shutter elements 23 may be reduced substantially.

The control circuit for monitoring the light amount is shown in FIG. 1. The detection output (analog electric current value) is converted into an analog voltage value by the I/V converter 14, and then converted into a digital value by the A/D converter 15. It is then stored in a predetermined area of the memory 18 via the data bus 16. This process is mainly controlled by the CPU 17, and is repeated during the non-imaging period with varying the voltage VD. When the next recording period begins, the CPU 17 performs control the power supply via the D/A converter 12 so that the voltage VD that corresponds to the maximum digital value stored in the memory 18 will be supplied to the drive ICs 30.

It is preferred that the same numbers of monitoring light shutter elements 23A and 23B be used. They should be placed in an area at which the light amount from both types of monitoring light shutter elements may be detected at the same time by the photosensor 13. Naturally, the added characteristic F may be detected by separately detecting the light amount from the light shutter elements 23A and 23B and calculating the total amount. In addition, it is preferred that all of the writing light shutter elements 23 be turned OFF during the light amount monitoring period, in order to prevent the light source 1 that is turned ON for the purpose of monitoring from irradiating and causing fatigue to the photoreceptor drum 7.

Variation

The optical writing device pertaining to the present invention is not limited to the embodiment described above, and may be modified in various ways within the scope of the invention. For example, the optical writing device is not limited to a device that exposes a photoreceptor, but may be a device that projects images onto a screen, for example.

In the first embodiment, for the conditions to drive the light amount monitoring light shutter elements 23A and 23B, the same condition as for the writing light shutter element driven most frequently and the same condition as for the writing light shutter element driven most infrequently were used, respectively, but the present invention is not limited to this implementation. For example, it is also acceptable if the conditions for driving the light amount monitoring light shutter elements 23A and 23B are that the light shutter elements 23A are driven throughout a recording period and the light shutter elements 23B are not driven throughout a recording period. While this method entails slightly less accuracy compared with the first embodiment, control may be carried out without any problems for practical purposes. Further, because it no longer becomes necessary to refer to the driving condition of the writing light shutter elements, the construction of the optical writing device may be made simpler.

Moreover, the detection circuit in which a monitoring photosensor is used and the optimal driving voltage determination circuit in the first embodiment may have various other constructions.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An optical writing device comprising:
    a plurality of writing light shutter elements used for image writing purposes;
    at least one first monitoring light shutter element;
    at least one second monitoring light shutter element; and
    a controller which controls said first and second monitoring light shutter elements so that said first monitoring light shutter element is driven under a first condition, while the second monitoring shutter element is driven under a second condition,
    wherein the first condition is to drive the first monitoring light shutter element frequently, and the second condition is to drive the second monitoring light shutter element infrequently.

2. The optical writing device as claimed in claim 1, wherein the first condition is same as a condition for the writing light shutter element which is most frequently driven, and the second condition is same as a condition for the writing light shutter element which is driven most infrequently may be used.

3. The optical writing device as claimed in claim 1, further comprising a sensor which senses light amount from said first and said second monitoring light shutter elements.

4. The optical writing device as claimed in claim 3, wherein said controller controls said first and second monitoring light shutter elements so as to be driven with varying voltages.

5. The optical writing device as claimed in claim 4, wherein said controller inputs an output from said sensor while said first and second monitoring light shutter elements are driven with varying voltages.

6. The optical writing device as claimed in claim 5, wherein said controller determines a drive voltage for the writing shutter elements based on the output from said sensor.

7. The optical writing device as claimed in claim 4, wherein said controller varies the voltages within a prescribed range.

8. The optical writing device as claimed in claim 7, wherein the prescribed range include zero volts up to a voltage that exceeds a half-wavelength voltage.

9. The optical writing device as claimed in claim 1, wherein said writing light shutter elements forms an array, and said first and second monitoring light shutter elements are disposed at one end of said array.

10. The optical writing device as claimed in claim 1, wherein the first condition is that the first monitoring light shutter element is continuously activated, and the second condition is that the second monitoring light shutter element is not activated.

* * * * *